United States Patent Office 3,629,448
Patented Dec. 21, 1971

3,629,448
NEMATOCIDES
Joseph W. Baker, Kirkwood, and Robert K. Howe, Bridgeton, Mo., assignors to Monsanto Company, St. Louis, Mo.
No Drawing. Continuation-in-part of application Ser. No. 681,578, Nov. 8, 1967. This application Dec. 4, 1969, Ser. No. 882,328
Int. Cl. A01n 9/20
U.S. Cl. 424—304                                              7 Claims

ABSTRACT OF THE DISCLOSURE

Nematocidal usage of 3,5-di(trifluoromethyl)anilinomethylenemalononitriles

---

This application is a continuation-in-part of copending application Ser. No. 681,578, filed Nov. 8, 1967, now U.S. Pat. No. 3,551,573.

This invention relates to the nematocidal usage of 3,5-di(trifluoromethyl)anilinomethylenemalononitriles of the formula

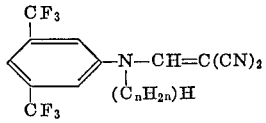

wherein $n$ is an integer from 0 to 4, inclusive, but preferably a whole number from 2 to 4, inclusive, which latter provides for the alkyl groupings ethyl, n-propyl and isopropyl, n-butyl and the various isomeric forms thereof.

These new nematocidal agents are described in copending U.S. patent application Ser. No. 681,578, filed Nov. 8, 1967, now U.S. Pat. No. 3,551,573, of which this application is a continuation-in-part. Therein is shown that anilinomethylenemalononitriles are prepared by known methods, for example, by reacting the appropriate aromatic amine with ethoxymethylenemalononitrile in an inert organic solvent at elevated temperatures, usually the reflux temperature, the resultant product being separated from the reaction mixture by conventional methods such as filtration, distillation, concentration, and the like. Other methods are also described therein for preparing anilinomethylenemalononitriles. The overall disclosure of said copending application is included herein by reference in order to avoid unnecessary enlargement of this application.

The nematocidal agents of this invention include:

3,5-di(trifluoromethyl)anilinomethylenemalononitrile,
3,5-di(trifluoromethyl)-N-methylanilinomethylene-malononitrile,
3,5-di(trifluoromethyl)-N-ethylanilinomethylene-malononitrile,
3,5-di(trifluoromethyl)-N-n-propylanilinomethylene-malononitrile,
3,5-di(trifluoromethyl)-N-isopropylanilinomethylene-malononitrile,
3,5-di(trifluoromethyl)-N-n-butylanilinomethylene-malononitrile, etc.

As illustrative of the nematocidal activity of the anilinomethylenemalononitriles of this invention but not limitative thereof, as compared to analogues [1] thereof, is the following:

(1) A 4-week old culture [2] of the vinegar eel worm, *Turbatrix aceti*, in equal volumes of plain vinegar and distilled water is admixed with an equal volume of distilled water. The mixture is agitated and sufficient thereof added to a plastic vial containing the compound to be evaluated as itemized below to provide a concentration of 10 p.p.m. of said compound. The vial is capped and shaken to assure a good mixture of the contents therein. Needle holes are made in the vial cap to permit air circulation. The so prepared vial and contents are then permitted to stand for 7 days at room temperature. Thereupon mortality observations were made. The results observed follow:

| Compound: | Percent kill |
|---|---|
| 3,5 - di (trifluoromethyl)anilinomethylenemalononitrile | 100 |
| 2 - chloro - 5 - (trifluoromethyl)anilinomethyl-enemalononitrile [1] | 0 |
| 2,4,5-trichloroanilinomethylenemalononitrile [1] | 0 |
| N - (tert.butyl)aminomethylenemalononitrile [1] | 0 |
| 3 - (trifluoromethyl)anilinomethylenemalononitrile [1] | 0 |

[1] Described in copending application Ser. No. 681,578, filed Nov. 8, 1967, now U.S. Pat. No. 3,551,573.
[2] 50 to 75 nematodes per ml.

(2) A 3-week old culture of the DD–136 strain of *Neoaplectana carpocapsae* Weiser (a nematode infestation of the codling moth larvae and other insect hosts) in a suitable agar medium was prepared so as to have a concentration of approximately 50 to 100 nematodes per ml. To each of 96 round bottom 3 ml. wells of a single tray is added the compound to be evaluated as itemized below as 0.2 ml. of an acetone solution thereof to provide a concentration of 10 p.p.m. of said compound. To each well is then added 1.8 ml. of the said agar mix. The respective wells are then totally covered with an 0.125″ sheet of plexiglass and incubated for 14 days at 68° F. Thereupon mortality observations were made. The results observed follow:

| Compound: | Percent kill |
|---|---|
| 3,5 - di(trifluoromethyl) - N - ethylanilinomethylenemalononitrile | 100 |
| 3,5 - di(trifluoromethyl) - N - n - propylanilinomethylenemalononitrile | 100 |
| 3,5 - di(trifluoromethyl) - N - isopropylanilinomethylenemalononitrile | 100 |
| 2,5 - dichloro - N - ethylanilinomethylenemalononitrile | 0 |
| 3,5 - dichloro - N - ethylanilinomethylenemalononitrile | 0 |
| N - (tert.butyl)aminomethylenemalononitrile | 0 |

The life cycle of parasitic nematodes is readily terminated by exposing same to a nematocidally effective amount of a compound of this invention. The nematocidal compounds of this invention are used per se but preferably in diluted form, e.g. sprays in liquid or dust form employing well known nematocidal adjuvants, to the nematode parasite or locus thereof to be protected.

The exact concentration of the anilinomethylenemalononitrile nematocides of this invention employed in combating or controlling nematodes can vary considerably provided the required dosage (i.e. nematocidal amount) thereof is supplied to the nematode or to the environment of the nematode. When the extending agent is a liquid, the concentration of anilinomethylenemalononitrile employed to supply the desired dosage will be in the approximate range of 0.001 to 50 percent by weight. When the extending agent is a semi-solid or solid, the concentration of the anilinomethylenemalononitrile employed to supply the desired dosage generally will be in the range of 0.1 to 25 percent by weight. The amount of active ingredient in a concentrate, which normally will be mixed with an extender, is 5 to 95 percent by weight.

The compounds of this invention are incorporated in a nematode-infested soil for control thereof at a rate of about 15 to about 75 lbs. per acre. The compounds are employed as a spray or particulate solid composition for soil incorporation purposes.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which resides in the present invention including all features which would be treated as equivalents thereof by those skilled in the art to which the invention pertains.

What is claimed is:

1. A method for terminating the life cycle of parasitic nematodes which comprises exposing same to a nematodicidally effective amount of a 3,5-di(trifluoromethyl)anilinomethylenemalononitrile of the formula

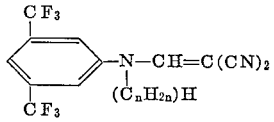

wherein $n$ is an integer from 0 to 4, inclusive.

2. A method of claim 1 wherein $n$ is a whole number from 2 to 4, inclusive.

3. A method of claim 2 wherein $n$ is 2, which active nematocide is 3,5 - di(trifluoromethyl) - N - ethylanilinomethylenemalononitrile.

4. A method of claim 2 wherein $n$ is 3, which active nematocide is 3,5-di(trifluoromethyl)-N-isopropylanilinomethylenemalononitrile.

5. A method of claim 2 wherein $n$ is 3, which active nematocide is 3,5 - di(trifluoromethyl)-N-n-propylanilinomethylenemalononitrile.

6. A method of claim 1 wherein $n$ is 0, which active nematocide is 3,5 - di(trifluoromethyl)anilinomethylenemalononitrile.

7. A method of claim 1 wherein the anilinomethylenemalononitrile is incorporated in a nematode infested soil at a rate of about 15 to about 75 pounds per acre.

References Cited

UNITED STATES PATENTS

| 3,079,366 | 2/1963 | Boyle et al. | 260—518 X |
| 3,309,396 | 3/1967 | Shulgin | 424—275 X |
| 3,551,573 | 12/1970 | Baker et al. | 424—304 |

JEROME D. GOLDBERG, Primary Examiner

D. R. ORE, Assistant Examiner

U.S. Cl. X.R.

260—465 E